United States Patent
Imai et al.

(10) Patent No.: US 10,720,649 B2
(45) Date of Patent: Jul. 21, 2020

(54) OXYGEN REDUCTION CATALYST, ELECTRODE, MEMBRANE ELECTRODE ASSEMBLY, AND FUEL CELL

(71) Applicant: SHOWA DENKO K.K., Tokyo (JP)

(72) Inventors: Takuya Imai, Tokyo (JP); Kazuo Furuya, Tokyo (JP); Kunchan Lee, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 0 days.

(21) Appl. No.: 16/495,635

(22) PCT Filed: Mar. 22, 2018

(86) PCT No.: PCT/JP2018/011350
§ 371 (c)(1),
(2) Date: Sep. 19, 2019

(87) PCT Pub. No.: WO2018/174143
PCT Pub. Date: Sep. 27, 2018

(65) Prior Publication Data
US 2020/0028182 A1   Jan. 23, 2020

(30) Foreign Application Priority Data

Mar. 24, 2017 (JP) ................................ 2017-059599

(51) Int. Cl.
*H01M 4/90* (2006.01)
*H01M 8/1004* (2016.01)
(Continued)

(52) U.S. Cl.
CPC ............ *H01M 4/90* (2013.01); *H01M 8/1004* (2013.01); *H01M 2004/8689* (2013.01); *H01M 2008/1095* (2013.01)

(58) Field of Classification Search
CPC ......... H01M 4/90; H01M 4/92; H01M 8/1004
See application file for complete search history.

(56) References Cited

U.S. PATENT DOCUMENTS

2011/0105311 A1     5/2011   Ueno et al.
2019/0386321 A1*   12/2019   Sakaguchi ............. B01J 27/051

FOREIGN PATENT DOCUMENTS

| CN | 103962157 A | 8/2014 |
| CN | 104888811 A | 9/2015 |
| JP | 2009-043618 A | 2/2009 |

OTHER PUBLICATIONS

Machine translation of CN 103962157 (Year: 2014).*
(Continued)

*Primary Examiner* — Robert S Jones
*Assistant Examiner* — Rachel L Zhang
(74) *Attorney, Agent, or Firm* — Sughrue Mion, PLLC

(57) ABSTRACT

Provided are an oxygen reduction catalyst having a high electrode potential under a fuel cell operating environment, an electrode containing the oxygen reduction catalyst, a membrane electrode assembly in which a cathode is the electrode, and a fuel cell including the membrane electrode assembly. The oxygen reduction catalyst used here contains cobalt, sulfur, and oxygen as elements, has a CoS hexagonal structure in powder X-ray diffractometry, and having an S—Co/S—O peak area ratio of 2.1 to 8.9 in an S2p spectrum in X-ray photoelectron spectroscopic analysis.

4 Claims, 2 Drawing Sheets

(51) Int. Cl.
 H01M 8/1018 (2016.01)
 H01M 4/86 (2006.01)

(56) References Cited

OTHER PUBLICATIONS

Mengxia Shen et al., "Covalent Entrapment of Cobalt-Iron Sulfides in N-Doped Mesoporous Carbon; Extraordinary Bifunctional Electrocatalysts for Oxygen Reduction and Evolution Reactions", ACS Applied Materials & Interfaces, 2015, pp. 1207-1218, vol. 7
Jihong Liu et al., "Hydrothermal synthesis and magnetic properties of nanoplate-assembled hierarchical structured $Co_{1-x}S$ microrods", Materials Characterization, 2012, pp. 112-118, vol. 67
H. Behret et al., "Electrocatalytic Oxygen Reduction with Thiospinels and other Sulphides of Transition Metals", Electrochimica Acta, 1975, pp. 111-117, vol. 20.
Qiao Liu et al., "A general and controllable synthesis of $Co_mS_n$ ($Co_9S_8$, $Co_3S_4$, and $Co_{1-x}S$) hierarchical microspheres with homogeneous phases", CrystEngComm, 2013, pp. 5087-5092, vol. 15.
Decision to Grant a Patent dated Aug. 28, 2018 by the Japan Patent Office in corresponding JPA No. 2018-538781.
International Search Report for PCT/JP2018/011350 dated Jun. 5, 2018 [PCT/ISA/210].
Fei Fu et al., "Three-dimensional $CoS_2$/RGO hierarchical architecture as superior-capability anode for lithium ion batteries", RSC Advances, vol. 5, pp. 71790-71795, 2015, 6 pages total.
Office Action dated Mar. 6, 2020, from the China National Intellectual Property Administration in Application No. 201880020215.6.
Communication dated Apr. 21, 2020, from the German Patent and Trademark Office in application No. 112018001572.6.
Min Zheng et al., "In Situ Grown Pristine Cobalt Sulfide as Bifunctional Photocatalyst for Hydrogen and Oxygen Evolution", Advanced Functional Materials, 2017, vol. 27, 1605846, pp. 1-11, (12 pages total).
Dong He at al., "Flower-like CoS with nanostructures as a new cathode-active material for rechargeable magnesium batteries", Journal of Power Sources, 2015, vol. 294, pp. 643-649 (8 pages total).

* cited by examiner

[Figure 1]
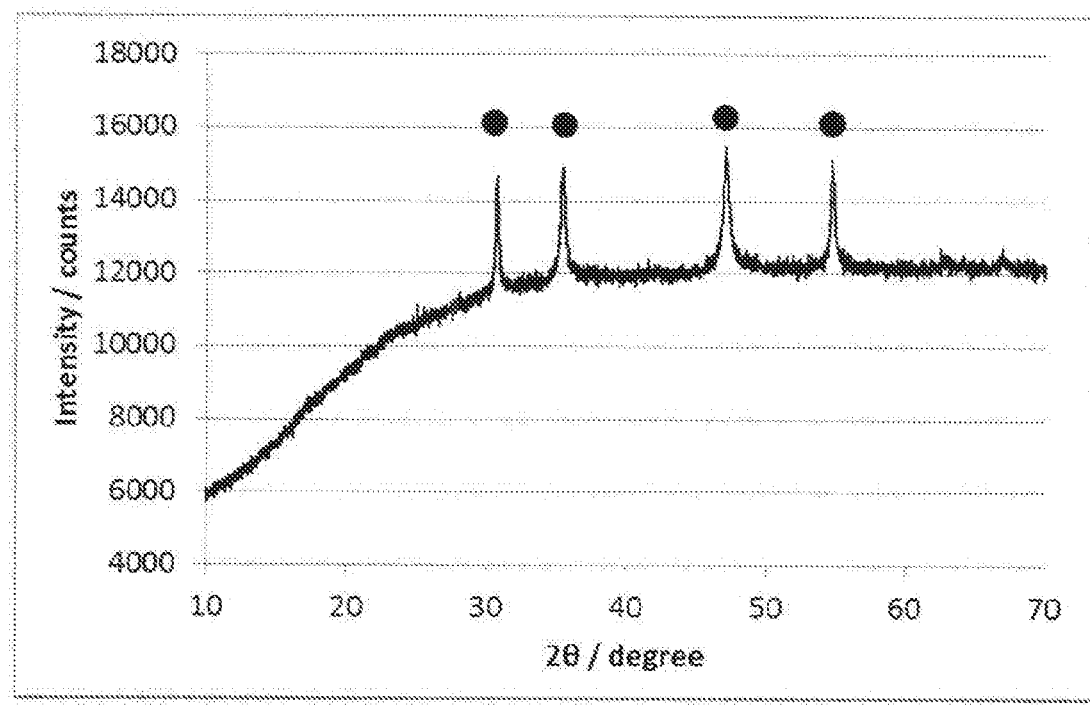

[Figure 2]
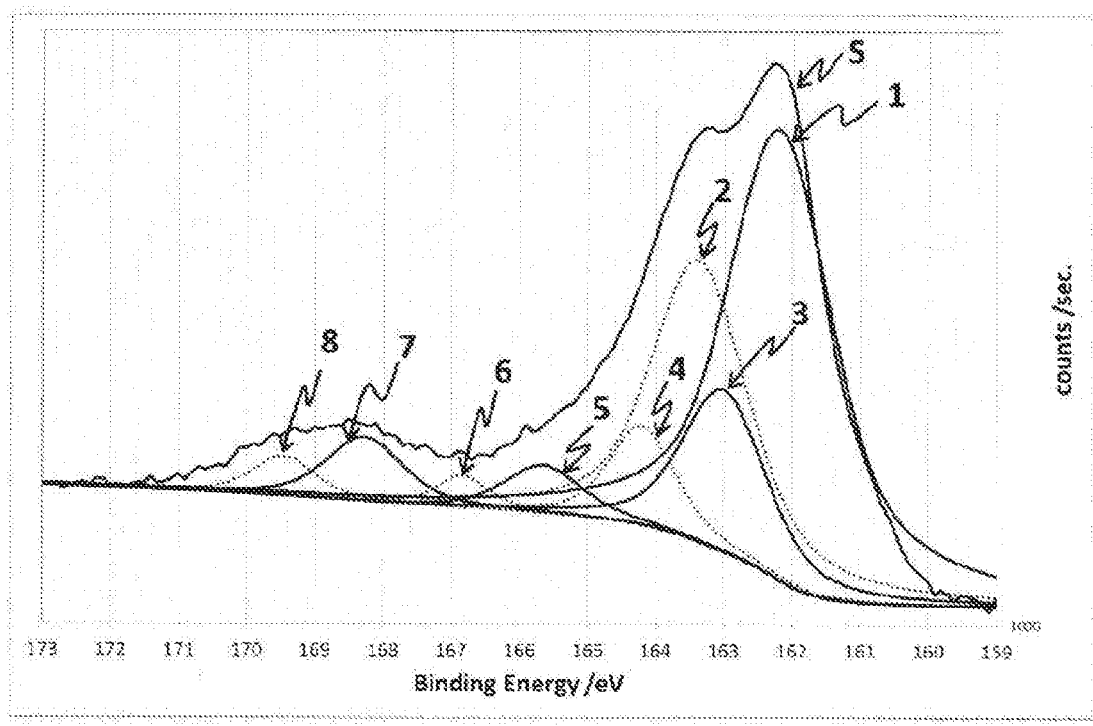
[Figure 3]
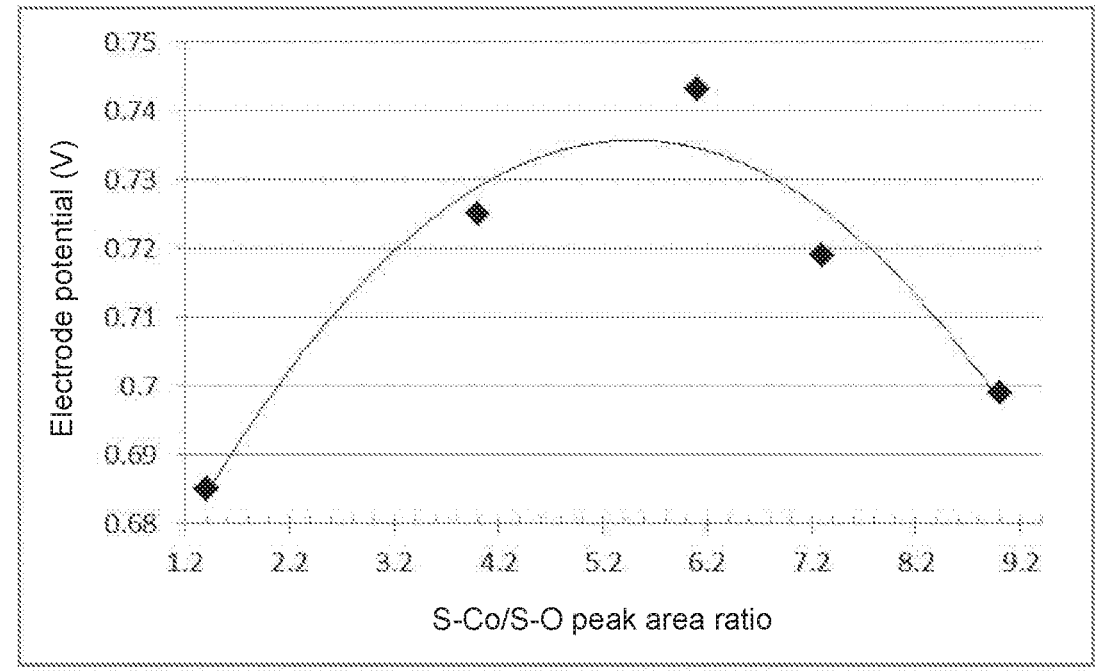

OXYGEN REDUCTION CATALYST, ELECTRODE, MEMBRANE ELECTRODE ASSEMBLY, AND FUEL CELL

TECHNICAL FIELD

The present invention relates to an oxygen reduction catalyst, an electrode including a catalyst layer containing the oxygen reduction catalyst, a membrane electrode assembly including the electrode, and a fuel cell.

BACKGROUND ART

A polymer electrolyte fuel cell (PEFC) is a fuel cell having a form in which: a solid polymer electrolyte is sandwiched between an anode and a cathode; a fuel is supplied to the anode; and oxygen or air is supplied to the cathode, whereby oxygen is reduced at the cathode to produce electricity. As the fuel, hydrogen gas or methanol and the like is mainly used. To enhance a reaction rate in the PEFC and to enhance the energy conversion efficiency of the PEFC, a layer containing a catalyst has been conventionally provided on the surface of a cathode or the surface of an anode of the fuel cell.

As such a catalyst, noble metals have been generally used, and, among the noble metals, platinum having high activity have been mainly used. In order to expand the application of the PEFC, the cost of the catalyst has been trially reduced, and particularly an inexpensive oxygen reduction catalyst containing no platinum and used for the cathode has been trially provided.

Meanwhile, the cathode of the PEFC is placed under a highly acidic-oxidizing atmosphere, and has a higher potential, whereby a material which is stable under the operating environment of the PEFC is extremely limited. In this environment, even platinum which is particularly stable among noble metals has been known to be oxidized and dissolved during long-term use, to cause deteriorated activity. This makes it necessary to use a large amount of noble metal for the cathode also from the viewpoint of maintaining the power generation performance of the PEFC, which has a big problem in terms of both cost and resource.

In order to solve the above-mentioned problems, specifically, from the viewpoint of the expansion of the application of the PEFC, particularly cost reduction and the like, a non-platinum-based oxygen reduction catalyst having high catalyst activity and high durability under the operating environment of the PEFC has been required.

Since metallic sulfide has a small band gap, and exhibits similar conductivity as that of metal, the metallic sulfide is used as a photocatalyst or an electrode catalyst involving an oxygen reduction reaction.

For example, Patent Literature 1 reports that, in a ternary chalcogenide catalyst containing Mo, Ru, and S elements, the ratio of coordination numbers between different elements: ((coordination number between transition metal element-sulfur)/(coordination number between transition metal element-sulfur-oxygen)) is related to the oxygen reduction characteristics of the catalyst.

Non Patent Literature 1 reports oxygen reduction catalysts of cobalt sulfides having different Co/S composition ratios, oxygen reduction catalysts in which cobalt sulfide is doped with transition metal, and synthesis methods thereof.

Non Patent Literature 2 reports oxygen reduction catalysts of cobalt sulfides having different Co/S composition ratios, and synthesis methods thereof.

However, in Patent Literature 1, Ru which is noble metal is used for a catalyst, and is not preferable in terms of cost. The ratio of the coordination number of one element to that of the other is not information on the surface of the catalyst in which the oxygen reduction reaction occurs but a bulk analysis result in the whole catalyst. $Co_3S_4$ described in Non Patent Literature 1 originally has oxygen reduction catalyst performance lower than that of $CoS_2$. Non Patent Literature 2 shows that an oxygen reduction activity behavior varies with the Co/S composition ratio of cobalt sulfide, but it does not show an activity behavior related to the composition of a catalyst surface in which an oxygen reduction reaction occurs. Non Patent Literature 2 does not describe cobalt sulfide having a CoS hexagonal structure. Conventional cobalt sulfide has insufficient oxygen reduction catalyst performance, whereby development of a catalyst having higher performance has been desired.

CITATION LIST

Patent Literature

Patent Literature 1: Japanese Patent Laid-Open No. 2009-43618

Non Patent Literature

Non Patent Literature 1: Electrochimica Acta 1975, 20, 111-117
Non Patent Literature 2: Cryst. Eng. Comm., 2013, 15, 5087-5092

SUMMARY OF INVENTION

Technical Problem

The present invention has been made to solve the above described problems, and it is an object of the present invention to provide an oxygen reduction catalyst which is much more inexpensive than a conventional platinum catalyst, and has a CoS hexagonal structure with a higher electrode potential under a fuel cell operating environment than that of an oxygen reduction catalyst having a conventional CoS hexagonal structure.

Solution to Problem

As a result of investigations for solving the problems, the inventors have found that the problems can be solved with the configuration examples described below, and have completed the invention. The configuration examples of the present invention are as follows.

The present invention relates to the following [1] to [4].

[1] An oxygen reduction catalyst comprising cobalt, sulfur, and oxygen as elements, having a CoS hexagonal structure in powder X-ray diffractometry, and having an S—Co/S—O peak area ratio of 2.1 to 8.9 in an S2p spectrum in X-ray photoelectron spectroscopic analysis.

[2] An electrode including a catalyst layer containing the oxygen reduction catalyst according to the above [1].

[3] A membrane electrode assembly including a cathode, an anode, and a polymer electrolyte membrane interposed between the cathode and the anode, wherein the cathode is the electrode according to the above [2].

[4] A fuel cell including the membrane electrode assembly according to the above [3].

Advantageous Effects of Invention

The present invention can provide an oxygen reduction catalyst having a CoS hexagonal structure with a higher electrode potential than that of an oxygen reduction catalyst having a conventional CoS hexagonal structure.

BRIEF DESCRIPTION OF DRAWINGS

FIG. 1 shows an X-ray diffraction (XRD) spectrum of an oxygen reduction catalyst obtained in Example 1. Black circle marks represent peaks assigned to a CoS hexagonal structure.

FIG. 2 shows an X-ray photoelectron spectroscopy (XPS) spectrum of S2p of the oxygen reduction catalyst obtained in Example 1. The obtained spectrum S, and first to eighth peaks represented by reference numerals 1 to 8 and subjected to peak separation are shown together. For the separated peaks to be viewed easily, a vertical axis is logarithmic, and peaks 2, 4, 6, and 8 are represented by dotted lines.

FIG. 3 is a graph showing a correlation between an S—Co/S—O peak area ratio and an electrode potential obtained in each of Examples and Comparative Examples. Data points and a secondary polynomial approximated curve are shown together in the graph.

DESCRIPTION OF EMBODIMENTS (Oxygen Reduction Catalyst)

An oxygen reduction catalyst of the present invention contains cobalt, sulfur, and oxygen, and has a CoS hexagonal structure in powder X-ray diffractometry. An S—Co/S—O peak area ratio in XPS analysis is 2.1 to 8.9.

(Elemental Composition)

The oxygen reduction catalyst of the present invention contains cobalt, sulfur, and oxygen as constituent elements. When unreacted sulfur which does not constitute cobalt sulfide remains, the unreacted sulfur may cause deteriorated durability of the oxygen reduction catalyst, but the unreacted sulfur may be contained so as not to cause deteriorated durability of the oxygen reduction catalyst.

The molar ratio of sulfur to cobalt contained in the oxygen reduction catalyst of the present invention is 1:0.85 to 1:1.15, preferably 1:0.90 to 1:1.10, and more preferably 1:0.95 to 1:1.05. The molar ratio of the constituent elements can be confirmed by an ordinary elemental analysis method. The amount of sulfur contained in the oxygen reduction catalyst can be obtained by using, for example, a carbon sulfur analyzer EMIA-920V (manufactured by Horiba, Ltd.). The amount of cobalt contained in the oxygen reduction catalyst can be obtained by thermally decomposing a sample completely by appropriately using sulfuric acid, nitric acid, and fluoric acid and the like, to prepare a constant-volume solution, and performing measurement using, for example, an elemental analyzer VISTA-PRO (manufactured by SII). The amount of oxygen contained in the oxygen reduction catalyst can be determined by an infrared absorption method using, for example, an oxygen nitrogen analyzer (TC600, manufactured by LECO).

(Crystal Structure)

The oxygen reduction catalyst of the present invention can be confirmed to have a CoS hexagonal structure by powder X-ray diffraction (XRD) measurement. The oxygen reduction catalyst may contain other crystal structures unless its catalyst characteristics are impaired, but peaks mainly assigned to the CoS hexagonal crystal structure are confirmed in the powder X-ray diffractometry.

In the powder X-ray diffractometry, as shown by black circle marks in an X-ray diffraction spectrum of FIG. 1, when diffraction peaks corresponding to 2θ=30.6 degrees, 35.3 degrees, 46.9 degrees, and 54.4 degrees in crystal information of reference code 03-065-8977 are observed, the catalyst is confirmed to have a CoS hexagonal crystal structure. Fluorescent X-rays derived from Co exhibit large intensity in a background in the XRD spectrum, but they do not affect the identification of a crystal structure.

In the oxygen reduction catalyst of the present invention, the crystal content of the CoS hexagonal structure is preferably 80% or more. The content of the CoS hexagonal crystal is more preferably 90%, and still more preferably 100%. In the specification of the present application, the content of the CoS hexagonal crystal (hereinafter, also referred to as a "hexagonal CoS content") means a percentage of the content by amount of a CoS hexagonal crystal based on the total amount of crystals confirmed in X-ray diffraction (XRD) measurement. The hexagonal CoS content is a value obtained from the diffraction peak intensity of the XRD spectrum, as follows.

Regarding all crystals including crystals having the CoS hexagonal structure confirmed in the XRD spectrum of the oxygen reduction catalyst, the intensity of a peak having the strongest diffraction intensity among the assigned peaks is determined for every crystal. An intensity percentage (%) is taken as the hexagonal CoS content. The intensity percentage is obtained by centupling a ratio of a numerator to a denominator, wherein the numerator is the diffraction intensity of the strongest peaks among the peaks assigned to the CoS hexagonal crystals, and the denominator is the sum of the diffraction intensities of the strongest peaks for all crystal systems containing the CoS hexagonal crystals.

As an X-ray diffractometer, PANalytical MPD manufactured by Spectris Co., Ltd. can be used, for example. Examples of measurement conditions include X-ray output (Cu-Kα): 45 kV and 40 mA, a scan axis: θ/2θ, a measurement range (2θ): 10 degrees to 90 degrees, a measurement mode: FT, a reading width: 0.02 degrees, a sampling time: 0.70 seconds, DS, SS, RS: 0.5 degrees, 0.5 degrees, 0.15 mm, and a goniometer radius: 185 mm.

(XPS Measurement)

XPS measurement can be performed by a method of Examples to be described later.

(Identification of XPS Peak)

In the oxygen reduction catalyst of the present invention, an S—Co/S—O peak area ratio in an S2p spectrum of XPS analysis is 2.1 to 8.9. The peak area ratio is determined by measuring an XPS spectrum of S2p in a binding energy range of 159 to 173 eV, subjecting the XPS spectrum to peak separation, and calculating a ratio of peak areas. A peak separated to two peaks per binding component, derived from 1/2 and 3/2 is observed in the XPS spectrum of S2p. Peaks derived from a plurality of binding components are observed in the binding energy range. According to the XPS handbook (1995 issue, p. 55) attached to the analyzer and manufactured by ULVAC-PHI, Inc., for peaks of S2p which is not subjected to peak separation, a binding energy range of 160.5 to 162.5 eV is derived from an S-metal element bond; a binding energy range of 162.0 to 164.0 eV is derived from an S—C bond; and a binding energy range of 165.5 to 168.5 eV is derived from an S—O bond. When, in a synthetic method for Examples of the present application using thiourea as a raw material, the raw material remains, a peak as the S—C bond may be observed in the binding energy range of 162.0 to 164.0 eV. However, it has been separately confirmed that a peak of S2p which is not subjected to peak separation is observed in the binding energy range of 162.0 to 164.0 eV also in CoS prepared by thermal decomposition of metal carbonyl used instead of the organic compound as a raw material, and that a peak derived from 3/2 after peak separation is in the binding energy range of 162.0 to 164.0 eV. Thus, in the present application, the peak derived from 3/2 after peak separation of S2P observed in the binding energy range of 162.0 to 164.0 eV has been determined to be derived from an S—Co bond. Therefore, a peak derived from 3/2 after peak separation observed in the range of 160.5 to 164.0 eV and a peak derived from 1/2 pairing with the peak derived from 3/2 are treated to be derived from an S—Co bond.

(Calculation of XPS Peak Area Ratio)

Peak separation processing can be performed by using analysis software attached to an X-ray photoelectron spectroscopic analyzer as described in the procedure of Examples to be described later. After peak separation processing, two peaks per binding component, derived from 1/2 and 3/2 of S2p are observed in a binding energy range of 159 to 173 eV in the XPS spectrum of S2p. The peak separation condition is not particularly limited as long as it can provide reproducible peak separation. The peaks subjected to peak separation are sorted into the peaks derived from the S—Co bond and the peaks derived from the S—O bond according to the binding energy range described above, and the areas of the peaks derived from the S—Co bond are summed, and the areas of the peaks derived from the S—O bond are summed. A peak area ratio of S—Co/S—O is calculated.

The peak area ratio of S—Co/S—O is 2.1 to 8.9. When the peak area ratio is lower than this range, S in the surface of the oxygen reduction catalyst has a sulfuric acid structure, whereby oxygen molecules subjected to oxygen reduction are less likely to be adsorbed to the surface, which tends to provide low catalyst performance. When the peak area ratio is higher than this range, S in the surface of the oxygen reduction catalyst is apt to be oxidized in a highly acidic fuel cell operating environment, which tends to cause low durability as a catalyst. The peak area ratio of S—Co/S—O is preferably 2.6 to 8.4, and more preferably 2.9 to 8.0. These ranges preferably provide a high electrode potential. It is considered that, if the surface of the oxygen reduction catalyst is not made of perfect CoS, and has S—O bonds as partial defects, oxygen is likely to be adsorbed, which provides high catalyst performance.

(Method for Producing Oxygen Reduction Catalyst)

The oxygen reduction catalyst of the present invention can be synthesized by reacting raw materials containing a sulfur source and a cobalt compound in an oxygen-containing atmosphere. For example, the oxygen reduction catalyst can be produced according to a precursor solution preparing step and subsequently a solvothermal treatment step, which steps will be described later.

(Precursor Solution Preparing Step)

In the precursor solution preparing step, a precursor solution is obtained by dissolving the cobalt compound and the sulfur source in a solvent.

The cobalt compound is sufficient if it can be dissolved in a solvent, and examples thereof include phosphates, sulfates, nitrates, organic acid salts, and halides (or intermediate hydrolysates of halides) of cobalt. These may be used alone or in combination of two or more.

The sulfur source is sufficient if it can be dissolved in a solvent, and examples thereof include thiourea, sodium sulfide, and potassium sulfide. These may be used alone or in combination of two or more.

The solvent is sufficient if it can dissolve the cobalt compound and the sulfur source, and examples thereof include ethanol, ethylene glycol, and water. These may be used alone or in combination of two or more.

The molar ratio of sulfur/cobalt as the raw materials are introduced is preferably within a range of 2 to 5. This range can provide CoS at a high yield, and suppress unreacted sulfur small, which is preferable. It is considered that a large portion of sulfur which is not used for synthesizing CoS is removed as thiourea as-is without being used for a reaction after a solvothermal step to be described later, or is removed as hydrogen sulfide gas out of the system.

(Solvothermal Treatment Step)

In the solvothermal treatment step, the precursor solution is charged into a container which can be pressurized such as an autoclave in an atmosphere containing oxygen gas such as air, heated, and reacted under ordinary pressure or more, to obtain an oxygen reduction catalyst having a CoS hexagonal structure. As the container which can be pressurized, a high pressure reaction decomposition vessel set manufactured by SAN-AI Kagaku Co. Ltd. can be used, for example. The high pressure reaction decomposition vessel set includes a PTFE (polytetrafluoroethylene) inner case. The precursor solution can be prepared by using the inner case as the container, and the inner case can be inserted into a high pressure reaction decomposition vessel as an outer case (made of stainless steel 304) as it is. When the high pressure reaction decomposition vessel set is used, heating can be performed in a state where the high pressure reaction decomposition vessel is placed on a hot stirrer with a temperature adjustment function, and the high pressure reaction decomposition vessel is covered with a heat retention cover. For example, a hot stirrer (model number: HM-19G-U) and an aluminum outer case (model number: RDV-TMS-100) manufactured by SAN-AI Kagaku Co. Ltd. can be used. From the viewpoint of improving the reactivity, the reaction temperature is preferably 190 to 220° C., and more preferably 200 to 210° C. From the same viewpoint, the reaction time is preferably 8 to 30 hours, and more preferably 8 to 24 hours. The solvothermal treatment is performed, followed by washing with the solvent, and drying, to obtain an oxygen reduction catalyst powder. The oxygen reduction catalyst powder is collected.

The amount of S—O bonds contained in the oxygen reduction catalyst of the present catalyst can be controlled by using a plurality of methods. In the solvothermal treatment of the precursor solution, the S—O bonds are formed on the oxygen reduction catalyst by charging the precursor solution into an autoclave and the like in the atmosphere containing oxygen gas, for example, the air. Mixed gas of oxygen-containing gas such as the air and inert gas such as nitrogen gas is used as the atmosphere gas during charging, to reduce the content of the oxygen gas in the mixed gas, whereby the S—O bonds to be formed can be reduced. When the content of the oxygen gas of the atmosphere gas while the precursor solution is charged into an autoclave and the like is the same, the S—O bonds can be increased by increasing the reaction time. Furthermore, the S—O bonds can be increased also by reducing the charged amount of the sulfur source in the precursor solution.

The present catalyst exhibits excellent oxygen reducing ability, and particularly a high electrode potential under the fuel cell operating environment. For this reason, the present catalyst can be suitably used for a fuel cell, and particularly a cathode of PEFC. The present catalyst is much more inexpensive than a conventional platinum catalyst.

(Electrode)

An electrode according to the present invention includes a catalyst layer containing the present catalyst. For this reason, the electrode is much more inexpensive than that in a case where platinum is used as a catalyst. The electrode may be a cathode or an anode, and the electrode is preferably the cathode from the viewpoint of high oxygen reducing ability.

(Catalyst Layer)

The catalyst layer is not particularly limited as long as it contains the present catalyst. The catalyst layer may be the same as a conventionally known catalyst layer except that the catalyst layer contains the present catalyst. The catalyst layer preferably contains the present catalyst and a polymer electrolyte. In order to further reduce electrical resistance in the catalyst layer, the catalyst layer may further contain electron conductive particles. The present catalyst contained in the catalyst layer may include two or more different catalysts.

The polymer electrolyte is not particularly limited, and, for example, those commonly used in a catalyst layer used in a conventional fuel cell can be used. Specific examples thereof include perfluorocarbon polymers having a sulfo group (such as NAFION®), hydrocarbon polymer compounds having a sulfo group, polymer compounds doped with inorganic acids such as phosphoric acid, organic/inorganic hybrid polymers partially substituted with proton conductive functional groups, and proton conductors containing a polymer matrix impregnated with a phosphoric acid solution or a sulfuric acid solution. Among these, NAFION® is preferable. The polymer electrolyte contained in the catalyst layer may include two or more different polymer electrolytes.

Examples of the material of the electron conductive particles include carbon, conductive polymers, conductive ceramics, metals, and conductive inorganic oxides such as tungsten oxide and iridium oxide. The particles may contain two or more of these materials. In particular, the electron conductive particles made of carbon are preferred because they tend to have a large specific surface area, the particles having a small particle size are easily available inexpensively, and they have excellent chemical resistance.

The electron conductive particles contained in the catalyst layer may include two or more different types. When the particles are of a single type, the carbon particles are preferred. When the particles are of two or more types, a mixture of carbon particles and other electron conductive particles is preferred. Examples of the carbon include carbon black, graphite, activated carbon, carbon nanotube, carbon nanofiber, carbon nanohorn, porous carbon, and graphene.

If the particle size of the electron conductive particles made of carbon is excessively small, an electron conductive path tends to be less likely to be formed. If the particle size is excessively large, the catalyst layer tends to have decreased gas diffusion properties or the catalyst usage rate tends to be lowered, and, therefore, the particle size of the electron conductive particles is preferably 10 to 1000 nm, and more preferably 10 to 100 nm. The primary particle size is an arithmetic mean value of measured values obtained by measuring the diameters of 50 electron conductive particles selected at random by transmission electron microscope observation.

When carbon particles are used as the electron conductive particles, the mass ratio of the present catalyst and the carbon particles (the present catalyst:carbon particles) in the catalyst layer is preferably 1:1 to 100:1.

A method for forming the catalyst layer is not particularly limited. Examples thereof include a method for applying a suspension, in which the constituent materials of the catalyst layer are dispersed in a solvent, to an electrolyte membrane or a gas diffusion layer and the like to be described later. Examples of the application method include a dipping method, a screen printing method, a roll coating method, a spraying method, and a bar coater application method. The method may be a method for forming a catalyst layer on a support by an application method or a filtration method with the suspension in which the constituent materials of the catalyst layer are dispersed in a solvent, followed by forming the catalyst layer on an electrolyte membrane or a gas diffusion layer and the like by a transfer method and the like. The shape including the thickness and the like of the catalyst layer is not particularly limited, and is sufficient if it is the same as that of a conventionally known catalyst layer.

(Membrane Electrode Assembly)

A membrane electrode assembly according to the present invention contains a cathode, a polymer electrolyte membrane, and an anode in this order. At least one of the cathode and the anode is the electrode, and the cathode is preferably the electrode. The membrane electrode assembly may include a gas diffusion layer on each of the opposite side of the polymer electrolyte membrane side of the cathode and the opposite side of the polymer electrolyte membrane side of the anode.

As the polymer electrolyte membrane, for example, a polymer electrolyte membrane containing a perfluorosulfonic acid-based polymer, or a polymer electrolyte membrane containing a hydrocarbon-based polymer, and the like is generally used. There may also be used a membrane in which a polymer porous membrane is impregnated with a liquid electrolyte, or a membrane in which a porous body is filled with a polymer electrolyte, and the like.

The gas diffusion layer is not particularly limited, and a conventionally known layer can be used. Examples thereof include a layer which is porous and assists diffusion of a gas. The gas diffusion layer preferably has electron conductivity, high gas diffusion properties, and high corrosion resistance. Carbon-based porous materials such as carbon paper and carbon cloth, and the like are used.

The membrane electrode assembly can be obtained by, for example, arranging a cathode, a polymer electrolyte membrane, and an anode in this order, or by arranging a gas diffusion layer, a cathode, a polymer electrolyte membrane, an anode, and a gas diffusion layer in this order when the gas diffusion layer is used, followed by pressing. Heat may be applied during the pressing. A laminated product in which the catalyst layer is formed on the polymer electrolyte membrane and/or the gas diffusion layer may be used for the membrane electrode assembly. When the laminated product is used, the laminated product may be arranged so that the catalyst layer side of the laminated product is the polymer electrolyte membrane side, followed by pressing.

(Fuel Cell)

A fuel cell according to the present invention includes the membrane electrode assembly. The fuel cell is not particularly limited, and examples thereof include a molten carbonate fuel cell (MCFC), a phosphoric acid fuel cell (PAFC), a solid oxide fuel cell (SOFC), and a PEFC. Among these, the fuel cell is preferably PEFC using hydrogen, methanol or the like as a fuel from the viewpoint of exhibiting the effects of the present invention more significantly and the like. The present catalyst has a high electrode potential under the operating environment of the PEFC.

EXAMPLES

Hereinafter, the present invention will be more specifically described with reference to Examples. It should be noted that these Examples are merely for illustrative purposes, and the present invention is not limited thereto. Electrochemistry measurement, powder X-ray diffractometry, X-ray photoelectron spectrometry, and peak separation processing in Examples and Comparative Examples were performed by the following methods and procedures.
(1) Electrochemistry Measurement
(Preparation of Catalyst Electrode)

A solution containing 15 mg of an oxygen reduction catalyst, 1.0 mL of 2-propanol, 1.0 mL of ion-exchanged water, and 62 μL of NAFION®, 5% Nafion aqueous solution, manufactured by Wako Pure Chemical Industries, Ltd.) was ultrasonically stirred and suspended for mixing. 20 μL of the mixture was coated on a glassy carbon electrode (diameter: 5.2 mm, manufactured by Tokai Carbon Co., Ltd.) and dried at 70° C. for 1 hour to prepare a catalyst electrode for catalyst activity measurement.
(Evaluation of Oxygen Reduction Catalyst Performance)

The oxygen reduction catalyst was subjected to electrochemistry measurement as follows. The prepared catalyst electrode was polarized at a potential scanning speed of 5 mV/second at 30° C. in an aqueous sulfuric acid solution of 0.5 mol/dm$^3$ in each of an oxygen gas atmosphere and a nitrogen gas atmosphere, to measure a current-potential curve. A natural potential (open-circuit potential) was obtained as a potential in a state where the catalyst electrode was not polarized in the oxygen gas atmosphere. In this case, a reversible hydrogen electrode in an aqueous sulfuric acid solution having the same concentration was used as a reference electrode. From the results of the electrochemistry measurement, an electrode potential at 10 μA (hereinafter, also referred to as an electrode potential) was obtained from a current-potential curve obtained by subtracting a reduction current in the nitrogen gas atmosphere from a reduction current in the oxygen gas atmosphere. The oxygen reduction catalyst performance of the oxygen reduction catalyst was evaluated by the electrode potential.
(2) Powder X-Ray Diffractometry The oxygen reduction catalyst was subjected to powder X-ray diffractometry using a powder X-ray diffractometer PANalytical MPD (manufactured by Spectris Co., Ltd.). The crystal structure of the oxygen reduction catalyst was identified in an X-ray diffraction spectrum obtained in a range of 2θ=10 to 90 degrees using Cu-Kα rays (output: 45 kV, 40 mA) as measurement conditions.
(3) X-Ray Photoelectron Spectrometry
(S2p Spectrum)

The oxygen reduction catalyst was subjected to X-ray photoelectron spectroscopic analysis using an X-ray photoelectron spectroscopic analyzer QuanteraII (manufactured by ULVAC-PHI, Inc.). A sample was fixed by embedding metal In. The oxygen reduction catalyst was subjected to X-ray photoelectron spectroscopic analysis under measurement conditions of X-rays: Al monochrome, 25 W and 15 kV, analysis area: 400×400 μm$^2$, electron-ion neutralization gun: ON, and photoelectron take-off angle: 45 degrees. Binding energy correction was performed using the C1s spectral peak energy from the adventitious hydrocarbon set at 284.6 eV.

(Peak Separation Processing)

Peak separation processing was performed by using analysis software (MULTI PACK (manufactured by ULVAC-PHI, Inc.)) attached to the X-ray photoelectron spectroscopic analyzer. Background processing was performed by the Shirley method, and curve fitting due to the non-linear least squares method was used in order to separate peaks. Fitting having good reproducibility was provided by dividing the structure of a spectrum into a total of eight peaks for fitting. For peaks of S2p3/2 in order of smaller binding energies, a first peak had a position set to 161.6±0.6 eV and a half-value width of 1.1±0.1, a third peak had a position set to 163.1±0.5 eV and a half-value width of 1.2±0.1, a fifth peak had a position set to 166.3±0.7 eV and a half-value width of 1.4±0.1, and a seventh peak had a position set to 168.2±0.4 eV and a half-value width of 1.8±0.2. Second, fourth, sixth, and eighth peaks assigned to peaks of S2p1/2 were automatically set in the analysis software. The first to fourth peaks were taken as peaks derived from S—Co, and the fifth to eighth peaks were taken as peaks derived from S—O. The peak area ratio of S—Co/S—O was calculated by using the sum of the areas of the first to fourth peaks and the sum of the areas of the fifth to eighth peaks shown as the results of the peak separation processing.

Example 1

(Catalyst Preparing Step)

40 mL of super dehydration ethanol (manufactured by Wako Pure Chemical Industries, Ltd.) was added to 0.291 g of cobalt nitrate hexahydrate (manufactured by Wako Pure Chemical Industries, Ltd.) and 0.343 g of thiourea (manufactured by Wako Pure Chemical Industries, Ltd.) using a PTFE inner case having a volume of 100 ml in a 100 ml set of a high pressure reaction decomposition vessel (model number HU-100, manufactured by SAN-AI Kagaku Co. Ltd.) as a container, followed by stirring to prepare a precursor solution. The precursor solution was inserted into a high pressure reaction decomposition vessel as an outer case of the 100 ml set of the high pressure reaction decomposition vessel under an air atmosphere for sealing in a state where the precursor solution was placed in the PTFE inner case. The precursor solution was subjected to a pressurizing heat treatment in a sealing system at 200° C. for 8 hours using a hot stirrer (model number: HM-19 G-U) and an aluminum outer case (model number: RDV-TMS-100) manufactured by SAN-AI Kagaku Co. Ltd. After the treatment, the treated matter was subjected to filtration washing using ethanol (manufactured by Wako Pure Chemical Industries, Ltd.), and dried in a vacuum dryer for 6 hours, to obtain an oxygen reduction catalyst (1).

A catalyst electrode was prepared by using the obtained oxygen reduction catalyst (1), and an electrode potential was obtained. The electrode potential is shown in Table 1.

The oxygen reduction catalyst (1) was subjected to powder X-ray diffractometry, and the oxygen reduction catalyst (1) was confirmed to have a CoS hexagonal structure. The obtained X-ray diffraction spectrum is shown in FIG. 1. Peaks represented by black circle marks are assigned to the CoS hexagonal structure as described above. All peaks to which no black circle marks are applied are similarly assigned to the CoS hexagonal structure, and diffraction peaks assigned to other crystal structures were not observed in the X-ray diffraction spectrum.

The oxygen reduction catalyst (1) was subjected to X-ray photoelectron spectrometry, and the obtained XPS spectrum of S2p was subjected to peak separation processing to calculate an S—Co/S—O peak area ratio. This value is shown together in Table 1. The XPS spectrum of S2p and the separated peaks are shown together in FIG. 2. The first to eighth peaks are respectively peaks represented by reference numerals 1 to 8.

Example 2

An oxygen reduction catalyst (2) was prepared in the same manner as in Example 1 except that the amount of thiourea was changed to 0.228 g. The oxygen reduction catalyst (2) was subjected to electrochemistry measurement, powder X-ray diffractometry, and X-ray photoelectron spectrometry in the same manner as in Example 1. The oxygen reduction catalyst (2) was confirmed to have a CoS hexagonal structure, and diffraction peaks assigned to other crystal structures were not observed. The electrode potential, and the S—Co/S—O peak area ratio calculated from the XPS spectrum of S2p are shown together in Table 1.

trometry in the same manner as in Example 1. The oxygen reduction catalyst (4) was confirmed to have a CoS hexagonal structure, and diffraction peaks assigned to other crystal structures were not observed in the X-ray diffraction spectrum. The electrode potential, and the S—Co/S—O peak area ratio calculated from the XPS spectrum of S2p are shown together in Table 1.

Comparative Example 2

An oxygen reduction catalyst (5) was prepared in the same manner as in Example 2 except that processing conditions in an autoclave were changed to 180° C. and 72 hours. The oxygen reduction catalyst (5) was subjected to electrochemistry measurement, powder X-ray diffractometry, and X-ray photoelectron spectrometry in the same manner as in Example 1. The oxygen reduction catalyst (5) was confirmed to have a CoS hexagonal structure, and diffraction peaks assigned to other crystal structures were not observed in the X-ray diffraction spectrum. The electrode potential, and the S—Co/S—O peak area ratio calculated from the XPS spectrum of S2p are shown together in Table 1.

TABLE 1

| | Conditions for producing oxygen reduction catalyst | | | | Oxygen reduction catalyst | | | |
|---|---|---|---|---|---|---|---|---|
| | Charged S/Co ratio (mol/mol) | Charged amount of thiourea (g) | Reaction temperature (° C.) | Reaction time (hour) | Crystal structure | Presence or absence of peak assigned to crystal systems other than hexagonal CoS | Content of hexagonal CoS (%) | S—Co/S—O peak area ratio | Electrode potential (V) |
| Example 1 | 4.5 | 0.343 | 200 | 8 | Hexagonal CoS | Absent | 100 | 7.3 | 0.719 |
| Example 2 | 3.0 | 0.228 | 200 | 8 | Hexagonal CoS | Absent | 100 | 6.1 | 0.743 |
| Example 3 | 3.0 | 0.228 | 200 | 24 | Hexagonal CoS | Absent | 100 | 4.0 | 0.725 |
| Comparative Example 1 | 6.0 | 0.457 | 200 | 8 | Hexagonal CoS | Absent | 100 | 9.0 | 0.699 |
| Comparative Example 2 | 3.0 | 0.228 | 180 | 72 | Hexagonal CoS | Absent | 100 | 1.4 | 0.685 |

Example 3

An oxygen reduction catalyst (3) was prepared in the same manner as in Example 2 except that a processing time at 200° C. was changed to 24 hours. The oxygen reduction catalyst (3) was subjected to electrochemistry measurement, powder X-ray diffractometry, and X-ray photoelectron spectrometry in the same manner as in Example 1. The oxygen reduction catalyst (3) was confirmed to have a CoS hexagonal structure, and diffraction peaks assigned to other crystal structures were not observed in the X-ray diffraction spectrum. The electrode potential, and the S—Co/S—O peak area ratio calculated from the XPS spectrum of S2p are shown together in Table 1.

Comparative Example 1

An oxygen reduction catalyst (4) was prepared in the same manner as in Example 1 except that the amount of thiourea was changed to 0.457 g. The oxygen reduction catalyst (4) was subjected to electrochemistry measurement, powder X-ray diffractometry, and X-ray photoelectron spec- From Table 1, it can be seen that an oxygen reduction catalyst containing cobalt, sulfur, and oxygen as elements, having a CoS hexagonal structure in powder X-ray diffractometry, wherein an S—Co/S—O peak area ratio in an S2p spectrum in X-ray photoelectron spectroscopic analysis is within a predetermined range, has a high electrode potential.

As shown in FIG. 3, a correlation as shown by a secondary polynomial approximated curve is revealed between the S—Co/S—O peak area ratio calculated in each of Examples and Comparative Examples and the electrode potential.

The invention claimed is:
1. An oxygen reduction catalyst comprising cobalt, sulfur, and oxygen as elements, having a CoS hexagonal structure in powder X-ray diffractometry, and having an S—Co/S—O peak area ratio of 2.1 to 8.9 in an S2p spectrum in X-ray photoelectron spectroscopic analysis.
2. An electrode comprising a catalyst layer containing the oxygen reduction catalyst according to claim 1.
3. A membrane electrode assembly comprising a cathode, an anode, and a polymer electrolyte membrane interposed between the cathode and the anode, wherein the cathode is the electrode according to claim 2.

4. A fuel cell comprising the membrane electrode assembly according to claim 3.

* * * * *